US010293894B1

(12) United States Patent
Allen

(10) Patent No.: US 10,293,894 B1
(45) Date of Patent: May 21, 2019

(54) CUP HOLDER RING FOR A MARINE VESSEL

(71) Applicant: Research & Design Innovations, LLC, Branford, CT (US)

(72) Inventor: Donald Terry Allen, Madison, CT (US)

(73) Assignee: Research & Design Innovations, LLC, Branford, CT (US)

( * ) Notice: Subject to any disclaimer, the term of this patent is extended or adjusted under 35 U.S.C. 154(b) by 0 days.

(21) Appl. No.: 15/832,043

(22) Filed: Dec. 5, 2017

Related U.S. Application Data

(60) Provisional application No. 62/437,352, filed on Dec. 21, 2016.

(51) Int. Cl.
B63B 29/00 (2006.01)
B63B 17/00 (2006.01)

(52) U.S. Cl.
CPC .............. *B63B 29/00* (2013.01); *B63B 17/00* (2013.01)

(58) Field of Classification Search
CPC ....... B63B 17/00; B63B 25/002; A01K 97/10; A47K 1/08; B60N 3/10; B60N 3/103; B60N 3/105; B60N 2/44
USPC ................................................ 114/343, 364
See application file for complete search history.

(56) References Cited

U.S. PATENT DOCUMENTS

| 7,343,870 | B1 * | 3/2008 | Scholz | B63B 25/002 114/364 |
| 7,500,443 | B1 * | 3/2009 | Allen | B63B 29/06 114/343 |
| 9,452,701 | B1 * | 9/2016 | Allen | A47K 1/08 |
| 2004/0084592 | A1 * | 5/2004 | Engel | B60N 3/106 248/311.2 |
| 2008/0314310 | A1 * | 12/2008 | Little | B63B 25/002 114/364 |
| 2011/0099883 | A1 * | 5/2011 | Baltes | A01K 97/10 114/364 |

* cited by examiner

*Primary Examiner* — Lars A Olson
(74) *Attorney, Agent, or Firm* — DeLio, Peterson & Curcio, LLC; Thomas E. Ciesco

(57) ABSTRACT

A mounting ring for securing a cup holder in an opening in a surface of a marine vessel. The mounting ring has a cylindrical wall and a flange extending from the ring for positioning about the surface around the opening. The mounting ring includes a plurality of braces extending downwardly from the flange, the braces comprising a plurality of legs extending downwardly from the cylindrical wall and a foot extending outwardly from the distal end of each leg at an acute angle to the leg. The mounting ring is placed in the opening and a cup holder is urged into the cup holder ring, the sides of the cup holder wall forcing the legs in a radially outwardly direction, securing the feet against an edge of the surface adjacent the boat opening. The mounting ring may include a protrusion disposed on an upper portion of each foot extending radially inwardly, the protrusion adapted to secure the outer surface of the cup holder wall in the mounting ring.

14 Claims, 3 Drawing Sheets

CUP HOLDER RING FOR A MARINE VESSEL

BACKGROUND OF THE INVENTION

1. Field of the Invention

The present invention relates to cup holders and a mounting ring for securing the cup holder in a cup holder opening in a marine vessel surface.

2. Description of Related Art

Cup holders are installed in openings of marine vessels so that a vessel occupant can place a cup, can, beverage container and the like into the cup holder. The cup holders are installed with a press fit or adhesive. The problem with a press fit is that the cup holder may loosen with time, especially given the thrashing that a marine vessel takes while in the water. Cup holders that are fastened into place with adhesives are difficult to remove without damaging the vessel deck or the cup holder. There is a need for a cup holder which may be installed in the deck of a vessel that will stay properly mounted until the mounting cup is purposely removed from the deck, without damaging the deck or the cup holder. Additionally, the cup holder should be easily installed so that a technician installing the cup holder will not spend excessive time performing the installation.

SUMMARY OF THE INVENTION

Bearing in mind the problems and deficiencies of the prior art, it is therefore an object of the present invention to provide a cup holder for a marine vessel which will neatly affix within an opening in the vessel deck.

It is another object of the present invention to provide a cup holder which can be installed in the deck of a vessel without motion of the vessel causing the cup holder to loosen in the deck opening.

A further object of the invention is to provide a cup holder which may be installed in a deck of a marine vessel and be later removed without damaging the vessel deck or the cup holder.

It is yet another object of the present invention to provide a cup holder for a marine vessel which may be quickly installed and easily uninstalled without damaging the vessel or cup holder.

Still other objects and advantages of the invention will in part be obvious and will in part be apparent from the specification. The above and other objects, which will be apparent to those skilled in the art, are achieved in the present invention which is directed to a mounting ring for securing a cup holder in an opening in a surface comprising a cylindrical wall and a flange extending from an upper rim of the ring for positioning about the surface around the opening. The mounting ring includes a plurality of braces of one or more lengths extending downwardly from the flange, the braces comprising a plurality of legs extending downwardly from the cylindrical wall and a foot extending outwardly from the distal end of each leg at an acute angle to the leg. The mounting ring is placed in the opening and a cup holder is urged into the cup holder ring, the sides of the cup holder wall forcing the legs in a radially outwardly direction, securing the feet against an edge of the surface adjacent the boat opening. The cylindrical wall may be at a first obtuse angle from the flange and the legs, when in the unstressed position, may be at a second obtuse angle from the flange greater than the first obtuse angle. The mounting ring may include a protrusion disposed on an upper portion of each foot extending radially inwardly, the protrusion adapted to secure the outer surface of the cup holder wall in the mounting ring.

Another aspect of the invention is directed to a mounting ring for securing a cup holder in an opening in a surface. The mounting ring comprises a cylindrical wall having an upper rim and an external wall surface disposable in the surface opening and a flange extending outwardly from the upper rim of the cylindrical wall. The mounting ring includes a plurality of braces extending downwardly from the cylindrical wall, the braces comprising legs extending downwardly from the cylindrical wall and a foot extending radially outwardly from the distal end of the leg at an acute angle to the leg. The mounting ring may include a protrusion disposed on an upper portion of the foot, the protrusion extending radially inwardly for securing a cup holder wall in the mounting ring. The plurality of braces may be of various lengths.

Another aspect of the invention is directed to a method for installing a cup holder. The method includes providing a cup holder and providing a mounting ring for securing a cup holder in an opening in a surface, the mounting ring including a cylindrical wall, a flange extending from an the ring for positioning about the surface around the opening and a plurality of braces of one or more lengths extending downwardly from the flange. The braces comprise a plurality of legs extending downwardly from the cylindrical wall and a foot extending outwardly from the distal end of each leg at an acute angle to the leg. The method includes placing the mounting ring in the surface opening and urging the cup holder into the cup holder ring, the sides of the cup holder wall forcing the legs in a radially outwardly direction, securing the feet against an edge of the surface adjacent the boat opening.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-6 of the drawings in which like numerals refer to like features of the invention.

Figure 1:
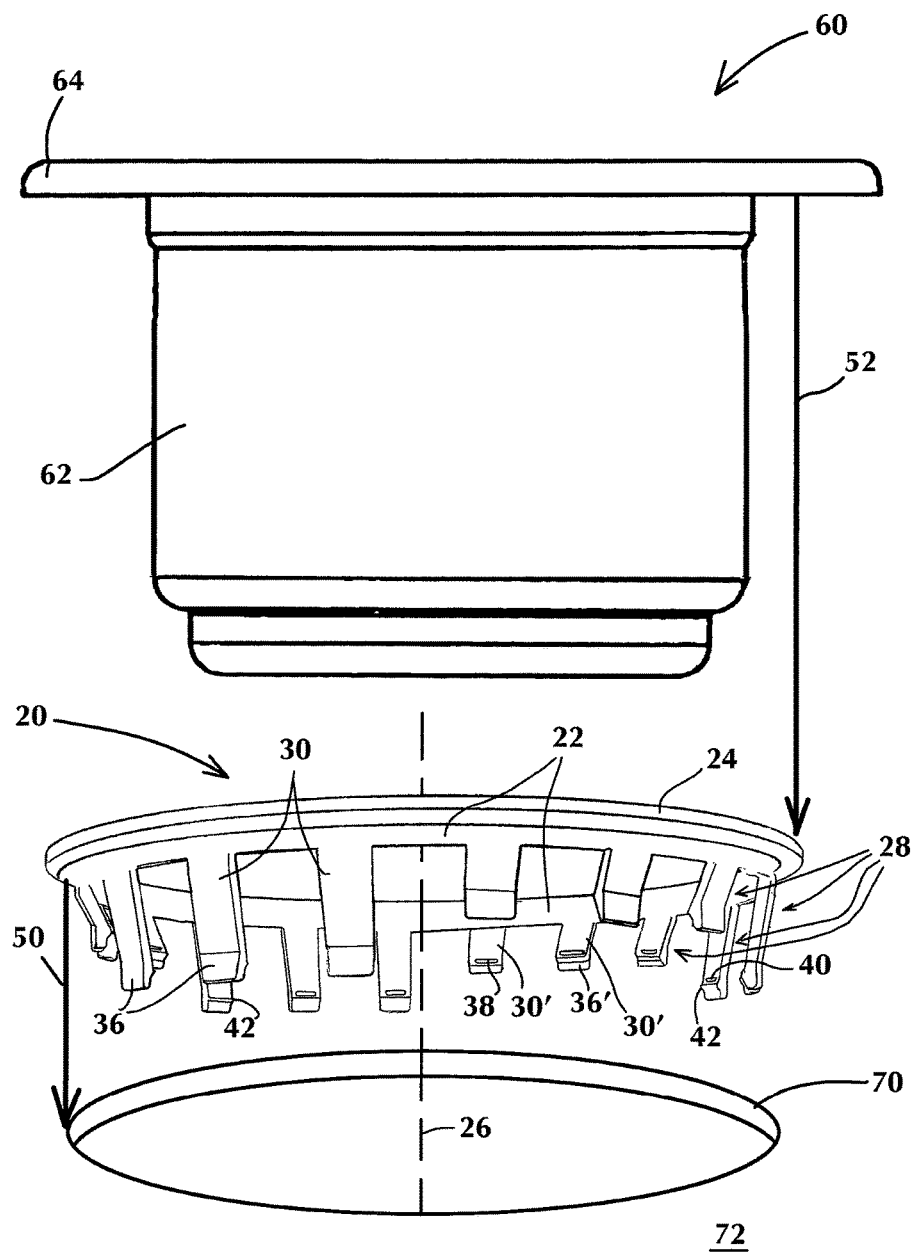
FIG. 1 is an exploded view of the cup holder mounting ring and cup holder according to the present invention.
Figure 2:
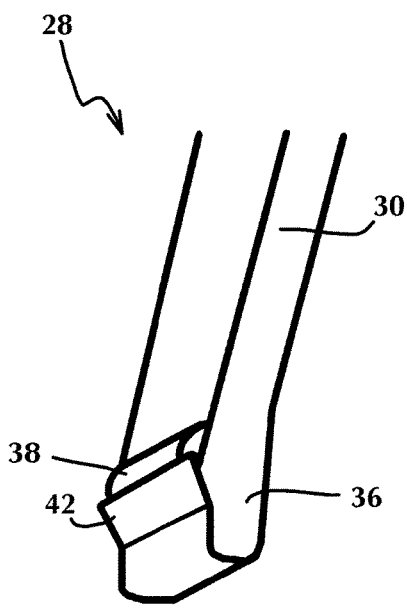
FIG. 2 is a perspective view of a portion of a mounting ring leg according to the present invention.
Figure 3:
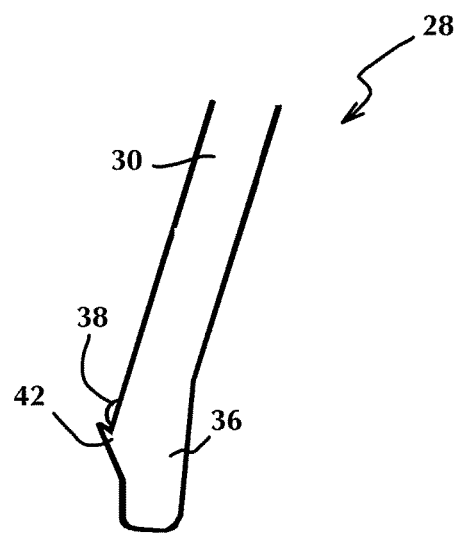
FIG. 3 is a side elevational view of a mounting ring leg showing the profile of the blade and the protrusion.
Figure 6:
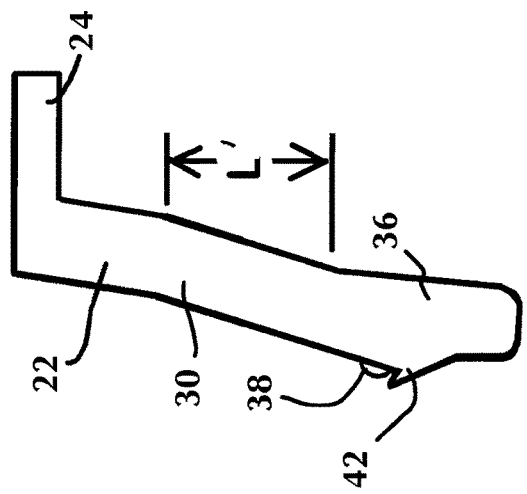
FIG. 6 is a cross sectional view of a second length leg according to the present invention.
Figure 5:
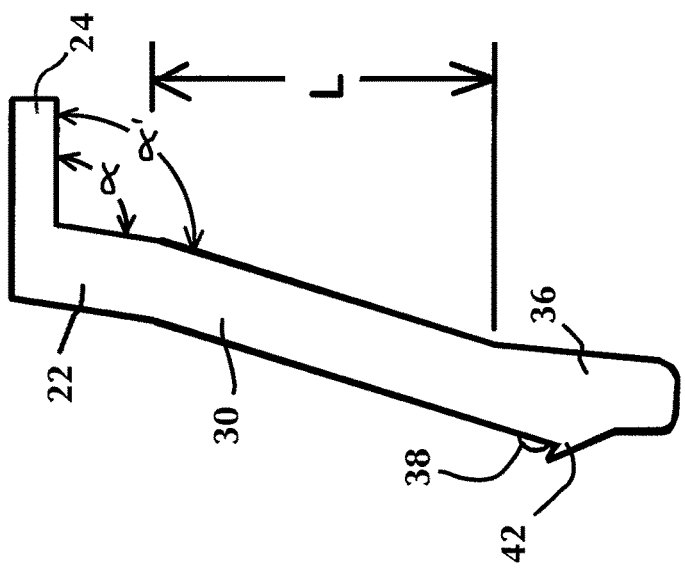
FIG. 5 is a cross sectional view of a first length leg according to the present invention.

The mounting ring 20 as shown in the attached drawings is installed into a cup holder opening 70, preferably an opening in a boat deck or other boat surface. FIG. 1 shows the mounting ring 20 having a lip or flange 24 extending from a cylindrical wall 22 which is disposable on the outside ledge of the marine vessel deck material into which the mounting ring 20 is installed. The mounting ring is inserted into the boat opening 70 and then the cup holder 60 is pushed into the mounting ring 20, the walls 62 of the cup holder 60 forcing different length legs 30, 30' in a direction outward from the mounting ring central axis 26. The legs 30, 30' and the feet 36, 36' extend from the bottom portion of the legs 30, 30' and catch or shim against the boat surface along the opening 70 when the cup holder is forced into the mounting ring 20 disposed in the boat opening 70. The mounting ring 20 may be used with plastic, stainless steel beverage holders of various sizes to meet requirement of the installation. A flange 64 on the cup holder 60 may include a lower groove to allow the mounting ring flange 24 to engage, allowing the cup holder flange 64 to rest against the boat surface when the cup holder is fully installed. The mounting ring 20 includes support braces 28 including different length legs 30, 30' and feet 36, 36' or reverse locks on the ends of the legs for securing the mounting ring 20 into the boat opening 70. The cylindrical wall 22 is at a first obtuse angle α from the flange and the legs, when in the unstressed position, are at a second obtuse angle α' from the flange greater than the first obtuse angle The embodiment shown in FIG. 1 staggers sets of three longer legs 36 with sets of two or three shorter legs 36'. Mounting ring 20 shows the legs having two different lengths although any combination of legs of varying length may be employed. FIG. 2 shows a perspective view of the brace 28 including leg 30 and foot 36. FIG. 3 shows a side elevational view of the brace 28 of FIG. 2. FIGS. 5 and 6 show a first leg length L and a shorter leg length L' respectively. The brace 28 includes a protrusion 38 extending radially inwardly from the foot 36 and may alternately or additionally include an upwardly facing blade 42 extending radially inwardly from the foot 36.

The cup holder 60 includes a cylindrical wall 62 and a cup holder flange 64 extending outwardly from the upper rim of the cylindrical wall 62. The mounting ring 20 includes a mounting ring cylindrical wall 22, a flange 24 extending from an upper rim of the mounting ring cylindrical wall 22, and a plurality of various length braces 28 extending downwardly from the cylindrical wall 22, the braces 28 comprising legs 30, 30' extending downwardly from the cylindrical wall 22 and a foot 36, 36' extending radially outwardly from the distal end of the leg 30, 30' at an acute angle to the leg. The mounting ring may include a protrusion 38 disposed on an upper portion of the foot 36, 36'. The protrusion 38 extends radially inwardly and secures the outer surface of the cup holder wall 62 in the mounting ring 20. The protrusions 38 may press into the cup holder wall 62, producing a divot in the cup holder wall 22 and securing the cup holder 60 in the mounting ring 20. The protrusion 38 may alternately use friction caused by the pressure of the protrusion 38 against the cup holder wall 62. The mounting ring 20 is placed in a cup holder opening 70 in the boat and the cup holder 60 is urged into the mounting ring 20, the sides of the cup holder wall 62 forcing the feet 36, 36' in an outwardly direction, securing the feet 36, 36' against an underside of the boat surface adjacent the boat opening 70. The protrusions 38 secure the outer surface of the cup holder wall 62 in the mounting ring 20. The mounting ring 20 may include an upwardly facing blade 42 extending from a portion of the feet 30, 30' to increase the dragging resistance of the feet when the cup holder 60 is urged in the upward direction with respect to the mounting ring 20.

The mounting ring 20 may be used to hold instrument dials as well as other circular instrumentation or accessories and may be sized for a specific instrument.

The device does not require mechanical fasteners, and provides for a quick and easy installation requiring placing the mounting ring in the surface opening and urging the cup holder into the mounting ring. Removal of the cup holder requires pulling up on the cup holder with sufficient force to overcome the engagement of the protrusion against the cup holder wall and/or the engagement of the blade against the cup holder wall. This may include inserting a screwdriver tip under the cup holder flange and prying upwardly on the flange. Since the surface opening in the boat may provide a good inspection port, the cup may be easily removed and the hole can then be used as an inspection port, the cup being reinstalled after the inspection. The ring may be manufactured from a strong plastic, acrylic or any other material which provides sufficient leg flexibility for securing the cup holder in place. The ring may be of any color material. Gaskets are not required to provide a water resistant installation.

Figure 4:
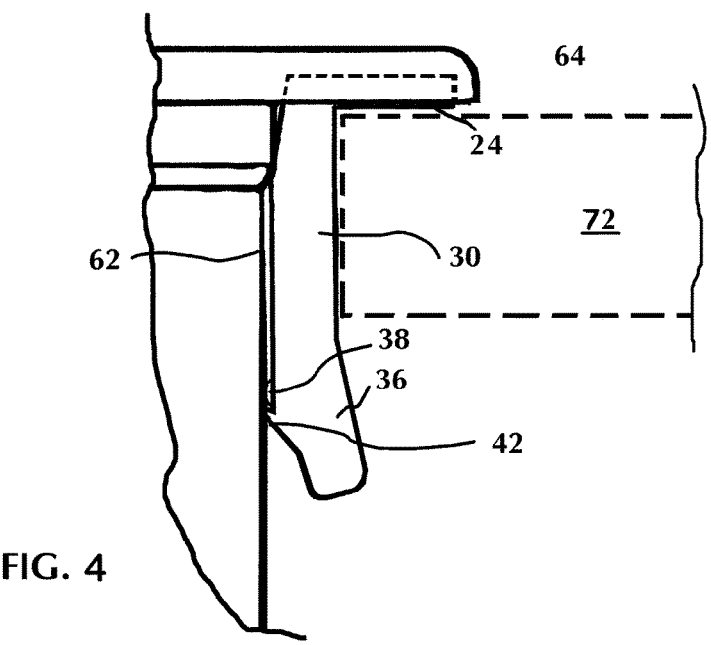
FIG. 4 is a cutaway view of the cup holder and mounting ring installed in a marine vessel surface.

Referring back to FIG. 1 and FIG. 4, the steps are shown in a method for installing a cup holder 62. The mounting ring 20 secures a cup holder 62 in an opening 70 in a marine vessel surface. The method includes placing the mounting ring 20 in the surface opening 70 by first directing the feet 36, 36' and the legs 30, 30' through the opening 70 in the direction of arrow 50 as shown in FIG. 1. The cylindrical wall 22 of the mounting ring 20 is urged into the opening until the flange 24 contacts the surface 72 of the marine vessel. The method includes urging the cup holder into the cup holder ring in the direction of arrow 52. The sides of the cup holder wall 62 forces the legs 30, 30' in a radially outwardly direction, securing the feet against an edge of the surface adjacent the marine vessel opening 70. FIG. 4 shows the cup holder wall 62 forcing the legs 30 against the marine vessel surface 72. The blade 42 prevents the cup holder 60 from sliding out unless enough force is exerted to slide the cup holder out if a user needs to remove the cup holder for any reason.

Thus, the present invention described herein is able to provide a cup holder for a marine vessel which will neatly affix within an opening in the vessel deck as well as a cup holder which can be installed in the deck of a vessel without motion of the vessel causing the cup holder to loosen in the deck opening. The present invention also provides a cup holder which may be installed in a deck of a marine vessel and be later removed without damaging the vessel deck or the cup holder. The present invention also provides a cup holder for a marine vessel which may be quickly installed and easily uninstalled without damaging the vessel or cup holder.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A mounting ring for securing a cup holder in an opening in a surface comprising:
   a cylindrical wall;
   a flange extending from an upper rim of the ring for positioning about the surface around the opening; and a plurality of braces of extending downwardly from the flange, each brace comprising a leg extending downwardly from the cylindrical wall and a foot extending outwardly from the distal end of each leg at an acute angle to the leg;

whereby the mounting ring is placed in the opening and a cup holder is urged into the mounting ring, the sides of the cup holder wall forcing the legs in a radially outwardly direction, securing the feet against an edge of the surface adjacent the surface opening.

2. The mounting ring of claim 1 including a protrusion disposed on an upper portion of each foot extending radially inwardly, the protrusion adapted to secure the outer surface of the cup holder wall in the mounting ring.

3. The mounting ring of claim 1 wherein the cylindrical wall is at a first obtuse angle from the flange and the legs, when in an unstressed position, are at a second obtuse angle from the flange greater than the first obtuse angle.

4. The mounting ring of claim 1 wherein the plurality of legs are of different lengths.

5. A mounting ring for securing a cup holder in an opening in a surface comprising:
   a cylindrical wall having an upper rim and an external wall surface disposable in the surface opening;
   a flange extending outwardly from the upper rim of the cylindrical wall;
   a plurality of braces extending downwardly from the cylindrical wall, each brace comprising a leg extending downwardly from the cylindrical wall and a foot extending radially outwardly from the distal end of the leg at an acute angle to the leg.

6. The mounting ring of claim 5 including a protrusion disposed on an upper portion of the foot, the protrusion extending radially inwardly for securing a cup holder wall in the mounting ring.

7. The mounting ring of claim 5 wherein the plurality of legs are of different lengths.

8. The mounting ring of claim 5 wherein the cylindrical wall is at a first obtuse angle from the flange and the legs, when in an unstressed position, are at a second obtuse angle from the flange greater than the first obtuse angle.

9. A method for installing a cup holder comprising:
   providing a cup holder;
   providing a mounting ring for securing a cup holder in an opening in a surface, the mounting ring including a cylindrical wall, a flange extending from an upper rim of the ring for positioning about the surface around the opening and a plurality of braces extending downwardly from the flange, each brace including a leg extending downwardly from the cylindrical wall and a foot extending outwardly from the distal end of the leg at an acute angle to the leg;
   placing the mounting ring in the surface opening; and
   urging the cup holder into the mounting ring, a wall on the cup holder forcing the legs in a radially outwardly direction, securing the feet against an edge of the surface opening.

10. The method of claim 9 including a step of urging the cup holder in an upward direction to slide the cup holder out of the mounting ring.

11. The method of claim 10 including removing the mounting ring from the surface opening.

12. The method of claim 9 wherein the mounting ring includes a protrusion disposed on an upper portion of each foot extending radially inwardly and the step of urging the cup holder into the mounting ring includes the protrusion securing an outer surface of a cup holder wall in the mounting ring to secure the cup holder in the mounting ring.

13. The method of claim 9 wherein the plurality of braces are of various lengths.

14. The method of claim 9 wherein the cylindrical wall is at a first obtuse angle from the flange and the legs, when in an unstressed position, are at a second obtuse angle from the flange greater than the first obtuse angle.

* * * * *